| (12) United States Patent | (10) Patent No.: US 9,876,425 B2 |
| Grezaud et al. | (45) Date of Patent: Jan. 23, 2018 |

(54) CONTROL CIRCUIT FOR POWER CONVERTER

(71) Applicant: Commissariat à l'Énergie Atomique et aux Énergies Alternatives, Paris (FR)

(72) Inventors: Romain Grezaud, Sassenage (FR); François Ayel, Saint Blaise du Buis (FR); Jean-Christophe Crebier, Bevenais (FR); Nicolas Rouger, Grenoble (FR)

(73) Assignee: Commissariat à l'Énergie Atomique et aux Énergies Alternatives, Paris (FR)

( * ) Notice: Subject to any disclaimer, the term of this patent is extended or adjusted under 35 U.S.C. 154(b) by 0 days.

(21) Appl. No.: 15/037,033

(22) PCT Filed: Nov. 27, 2014

(86) PCT No.: PCT/EP2014/075828
§ 371 (c)(1),
(2) Date: May 16, 2016

(87) PCT Pub. No.: WO2015/078973
PCT Pub. Date: Jun. 4, 2015

(65) Prior Publication Data
US 2016/0254750 A1 Sep. 1, 2016

(30) Foreign Application Priority Data
Nov. 27, 2013 (FR) ...................................... 13 61689

(51) Int. Cl.
*H02M 3/158* (2006.01)
*H02M 1/08* (2006.01)
(Continued)

(52) U.S. Cl.
CPC ............. *H02M 3/158* (2013.01); *H02M 1/08* (2013.01); *H02M 1/38* (2013.01); *H02M 2001/0009* (2013.01)

(58) Field of Classification Search
CPC ............ H02M 3/156–3/158; H02M 2001/007; H02M 2001/009; H02M 2001/0032; H02M 2001/0045; Y02B 70/1466
(Continued)

(56) References Cited

U.S. PATENT DOCUMENTS 5,929,665 A * 7/1999 Ichikawa ................ H01L 29/00
327/109
6,330,172 B1 * 12/2001 Fontanella .............. H02M 1/38
363/132
(Continued)

FOREIGN PATENT DOCUMENTS

WO WO 2014035775 A3 * 4/2014 .............. H02M 1/38

OTHER PUBLICATIONS

International Search Report, dated May 6, 2015, from corresponding International Application No. PCT/EP2014/075828.
(Continued)

*Primary Examiner* — Yemane Mehari
(74) *Attorney, Agent, or Firm* — Wolf, Greenfield & Sacks, P.C.

(57) ABSTRACT

A circuit for controlling a first field-effect transistor of a power converter, intended for a converter including at least one first and one second transistor connected in series between two terminals for applying a first voltage, the circuit including a circuit for detecting the opening of the second transistor.

8 Claims, 7 Drawing Sheets

(51) Int. Cl.
*H02M 1/38* (2007.01)
*H02M 1/00* (2006.01)

(58) Field of Classification Search
USPC .................................................. 323/265–272
See application file for complete search history.

(56) References Cited

U.S. PATENT DOCUMENTS

| | | |
|---|---|---|
| 8,102,677 B2 | 1/2012 | Nakanishi |
| 2004/0041619 A1 | 3/2004 | Nadd |
| 2006/0164867 A1 | 7/2006 | Dikken et al. |
| 2007/0085589 A1 | 4/2007 | Yoshikawa |
| 2012/0256671 A1 | 10/2012 | Xu et al. |
| 2013/0082741 A1 | 4/2013 | Domes |

OTHER PUBLICATIONS

Written Opinion, dated May 6, 2015, from corresponding International Application No. PCT/EP2014/075828.

* cited by examiner

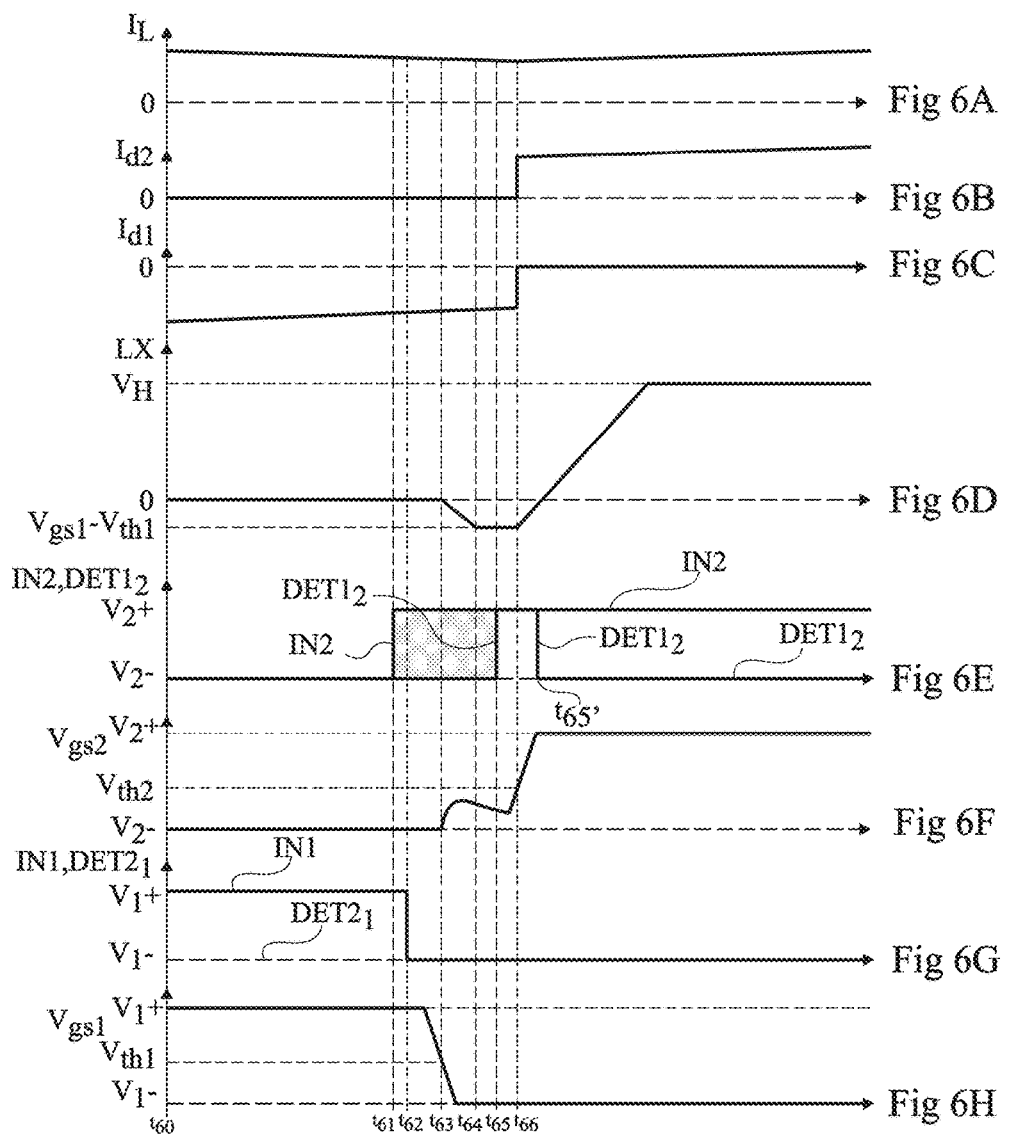

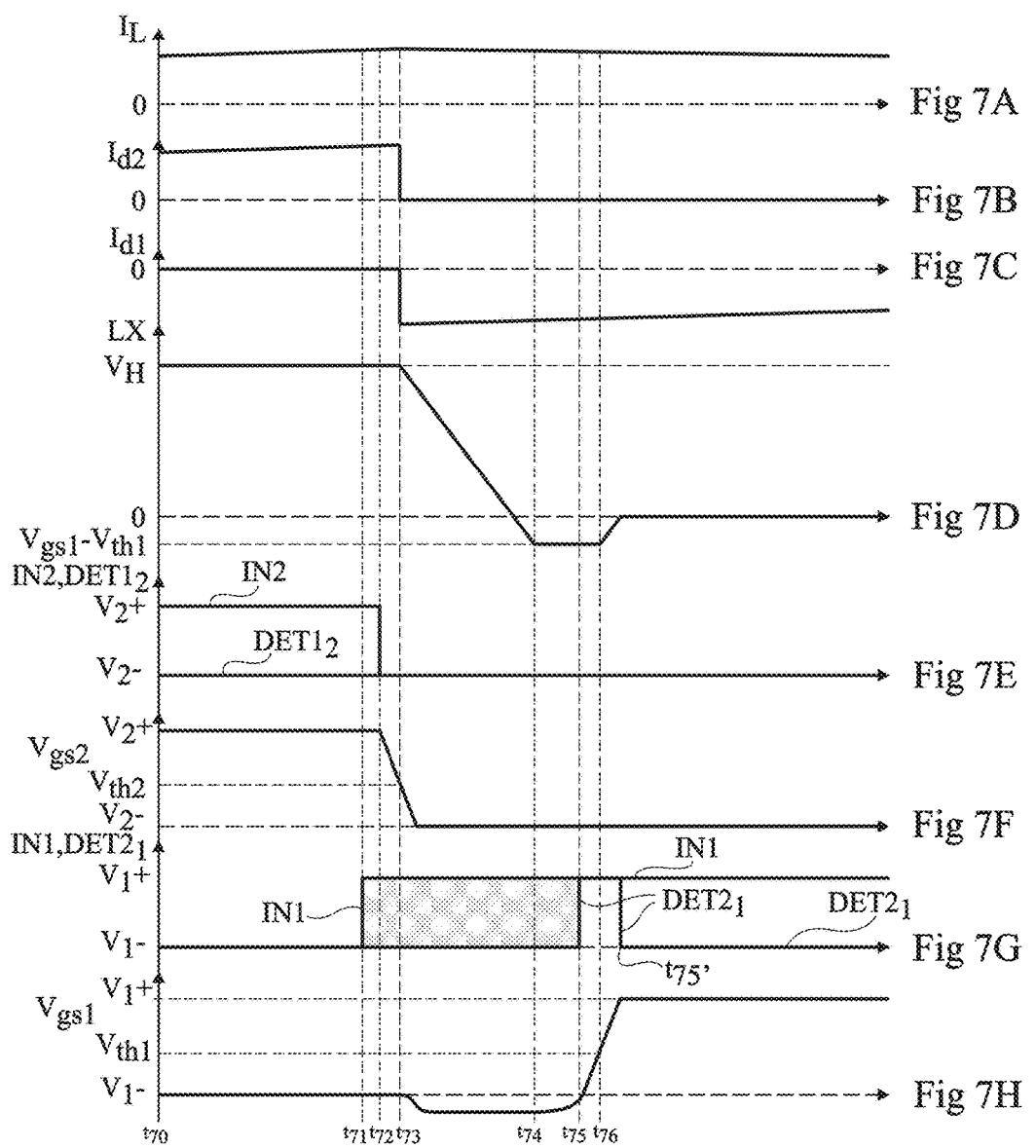

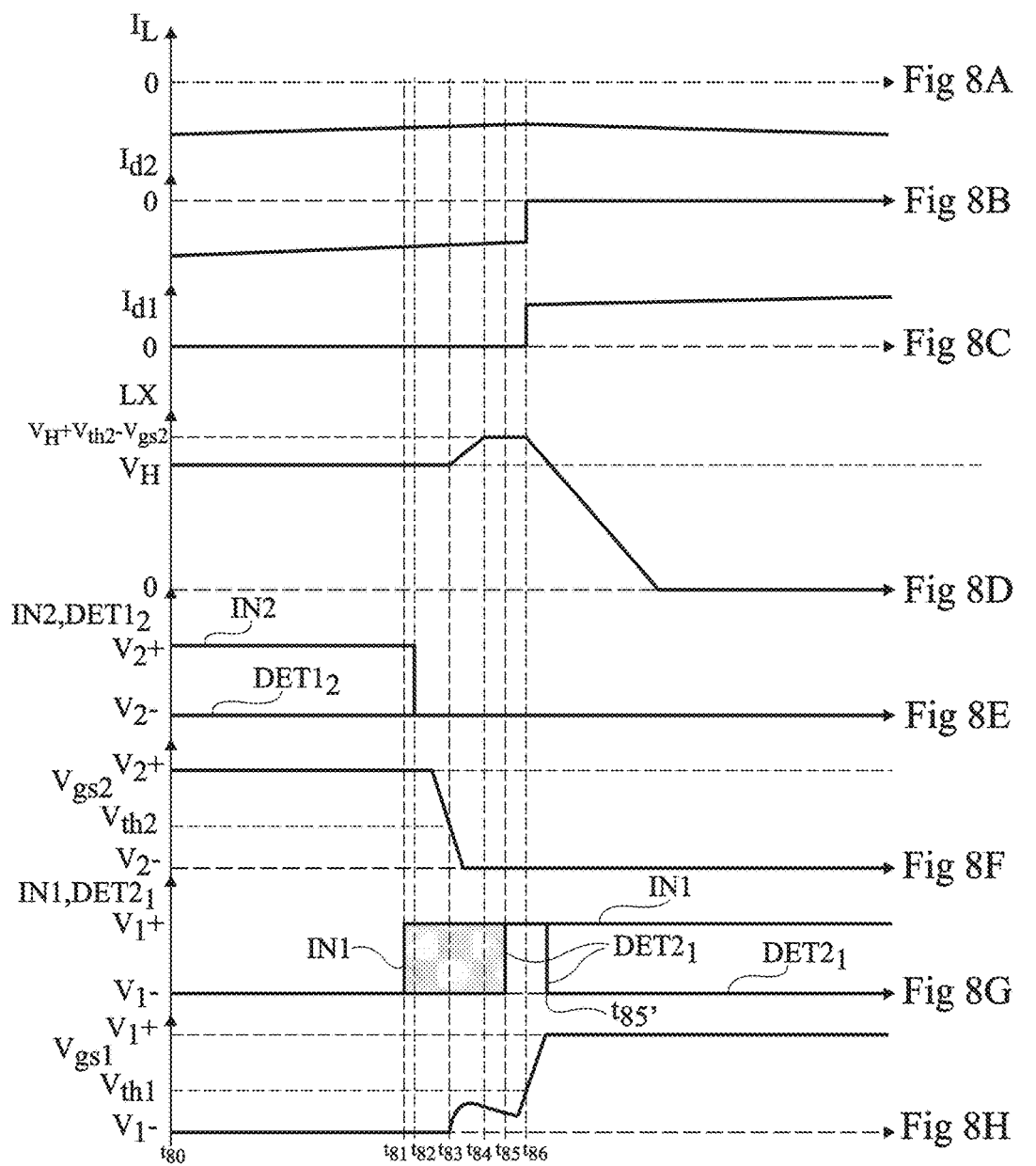

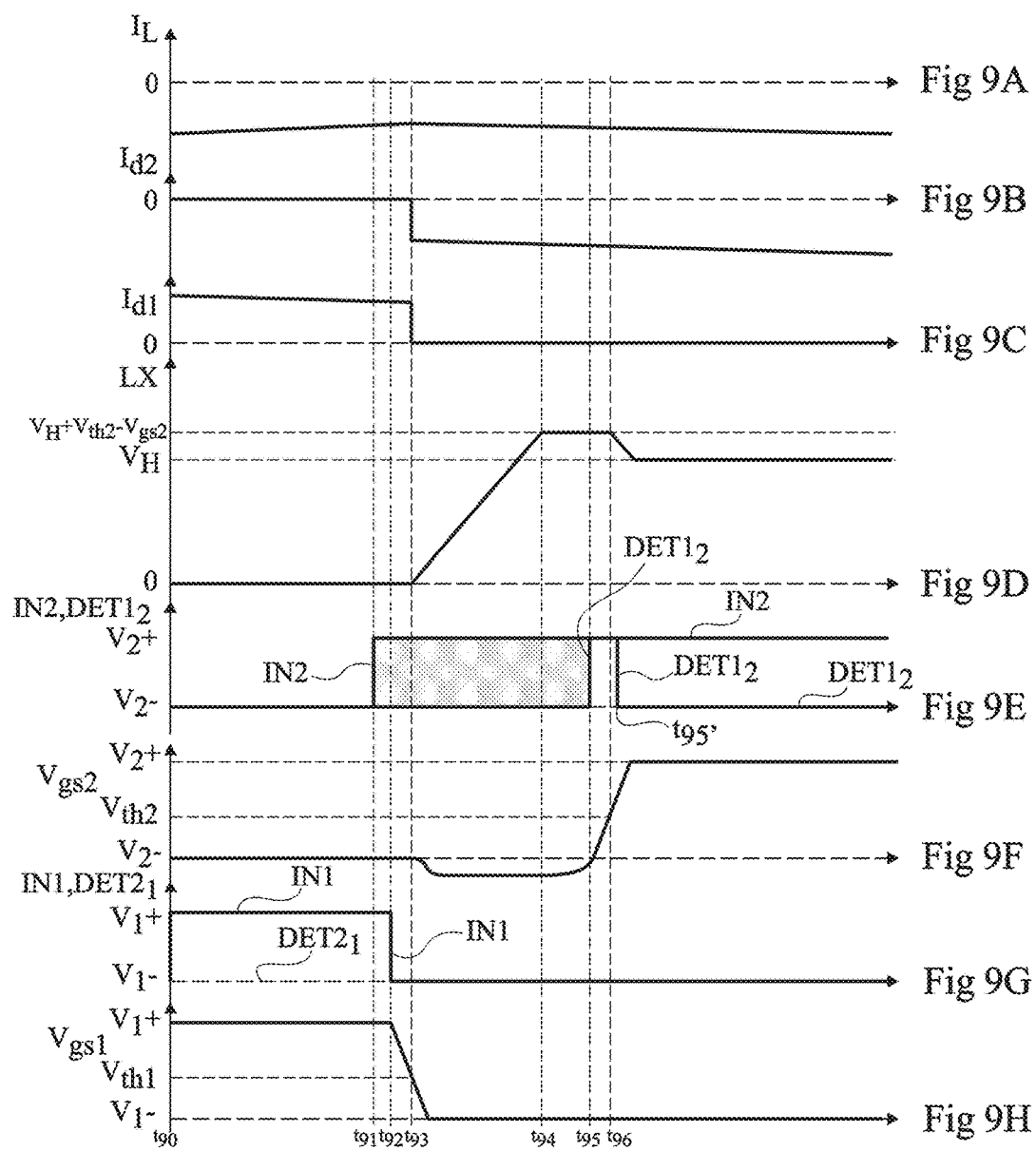

CONTROL CIRCUIT FOR POWER CONVERTER

CROSS-REFERENCE TO THE RELATED APPLICATIONS

This application is the national phase of International Application No. PCT/EP2014/075828, filed on Nov. 27, 2014, which claims the priority benefit of French patent application FR13/61689, filed on Nov. 27, 2013, which applications are hereby incorporated by reference to the maximum extent allowable by law.

BACKGROUND

The present disclosure generally relates to electronic circuits, more particularly to the field of power converters and, more specifically, to the forming of a control circuit for a power converter.

DISCUSSION OF THE RELATED ART

Power converters are widely used in electronics.

The present disclosure generally relates to electric power supplies comprising, between two terminals of application of a DC or AC power input voltage, two series-connected switches having their junction point generally connected to an inductive element, for example forming the inductance of the output filter, the primary of a transformer, the inductance of an electric motor . . . .

The presence of at least two series-connected switches between two power supply terminals requires a control avoiding a simultaneous conduction of the two switches. Such switches are generally formed of field-effect transistors, most often of MOS transistors, of JFETs, or of high electron mobility transistors (HEMTs). Thereby, "dead times" during which the two transistors are off have to be provided between the respective conduction periods of the transistors. During such "dead times", the gate-source voltage is lower than the threshold voltage of the transistor and a current flows in the reverse direction either through the internal diode of one of the transistors if it contains one, or through the channel thereof, or through an external diode connected in antiparallel. In all cases, the flowing of this current in the reverse direction at such times generates unwanted losses. It is thus generally desired to decrease the dead time during which the two power switches are off.

Different solutions have already been provided to decrease the dead time. In particular, since the switching speed varies according to the operating point of the converter and to temperature, the dead time is desired to be made self-adaptive so that it is as short as possible while keeping a protection against short-circuit.

Such solutions are however poorly adapted to power converters having their switching transistors supplied with a relatively high voltage (higher than 20 V), or to power converters having their switch control circuits formed of field-effect transistors.

Document US 2007/085589 describes a DC/DC step-down converter comprising circuits for detecting the turning-off of series-connected N-channel transistors to decrease dead times.

Document US 2004/041619 describes a circuit for preventing a simultaneous conduction of series-connected transistors.

Document US 2006/164867 describes a DC/DC converter equipped with a circuit for setting the dead time.

Document U.S. Pat. No. 5,929,665 describes a power converter where a circuit detects the conductive and non-conductive states of transistors.

All the above solutions require information exchanges between the portions (high and low) associated with the respective transistors.

Documents US 2012/112775 and US 2013/082741 describe circuits detecting the state of an IGBT transistor to improve the conductive state of its internal diode.

Such solutions require current mirrors in the control circuits, which adversely affect the bulk and are not compatible with a forming in CMOS technology, particularly SOI.

SUMMARY

An embodiment of the present description aims at providing a control circuit for a power converter which overcomes all or part of the disadvantages of usual circuits.

An embodiment of the present disclosure more particularly aims at a solution adapted to any power circuit, for example, a power converter, having its switches formed by field-effect transistors (be they or not manufactured in a same technology) with or without a parasitic internal diode between the drain and the source, series-connected between two terminals of application of a power supply voltage, and driven by control circuits also formed of field-effect transistors (manufactured or not in a same technology).

Another embodiment more particularly aims at a solution for automatically adapting the dead time during which the power transistors are simultaneously non-conductive, compatible with the terminals usually accessible in an input stage of a power converter.

Another embodiment aims at providing a solution avoiding current mirrors.

Another embodiment aims at providing a solution compatible with a manufacturing of the control circuit in CMOS technology.

Thus, an embodiment provides a circuit for controlling a first field-effect transistor of a power converter, intended for a converter comprising at least a first and a second transistor series-connected between two terminals of application of a first voltage, said circuit comprising a circuit for detecting the turning-off of the second transistor.

More particularly, an embodiment provides a circuit for controlling a first field-effect transistor of a power converter, intended for a converter comprising at least a first and a second transistor series-connected between two terminals of application of a first voltage, said circuit comprising:

an output terminal intended to be connected to the gate of the first transistor; and an input terminal intended to be connected to the source of the first transistor;

two control transistors series-connected between two terminals of application, respectively, of a first power supply voltage which is positive or zero with respect to the potential present on said input terminal and of a second power supply voltage which is negative or zero with respect to said potential of the input terminal, the junction point of the two series-connected control transistors being connected to the gate of the first transistor;

a control terminal intended to receive a signal for controlling the turning on or off of the first transistor;

a circuit for detecting a variation of the drain-source voltage due to the turning-off of the second transistor, the detection circuit being connected to the gate of the first transistor and detecting a variation of the gate current or of the gate-source voltage of the first transistor when the control circuit is in a first operating mode, called monitoring mode, where the two control transistors are off, placing the gate of the first transistor in a high-impedance state; and a logic block for combining said control signal and at least one signal supplied by said detection circuit to control the turning on or off of each of the control transistors.

According to an embodiment, the detection circuit is powered between said two terminals of application of first and second power supply voltages.

According to an embodiment, the detection circuit comprises at least one stage comprising a current mirror formed of two MOS transistors having a transistor having its source connected to a terminal of application of the second power supply voltage, the other transistor having its source connected to the output terminal of the control circuit.

An embodiment also provides a power converter comprising at least a first and a second transistor series-connected between two terminals of application of a first voltage, wherein the first and second transistors are each controlled by a circuit such as hereabove.

According to an embodiment:

a first circuit for controlling the first transistor having its output terminal connected to one of said terminals of application of the DC voltage; and a second circuit for controlling the second transistor having its input terminal connected to the junction point of the first and second transistors.

According to an embodiment, the circuit further comprises a circuit for supplying control signals to the first and second transistors.

An embodiment also provides a method of controlling a converter, wherein a variation of the drain-source voltage is detected at the level of the gate of each transistor.

BRIEF DESCRIPTION OF THE DRAWINGS

The foregoing and other features and advantages will be discussed in detail in the following non-limiting description of specific embodiments in connection with the accompanying drawings, among which:

FIGS. 6A, 6B, 6C, 6D, 6E, 6F, 6G, and 6H illustrate, in the form of timing diagrams, an operating mode of the power converter in the configuration of FIG. 4B;

FIGS. 7A, 7B, 7C, 7D, 7E, 7F, 7G, and 7H illustrate, in the form of timing diagrams, an operating mode of the power converter in the configuration of FIG. 5B;

FIGS. 8A, 8B, 8C, 8D, 8E, 8F, 8G, and 8H illustrate, in the form of timing diagrams, another embodiment of the power converter in the configuration of FIG. 4B;

FIGS. 9A, 9B, 9C, 9D, 9E, 9F, 9G, and 9H illustrate, in the form of timing diagrams, another operating mode of the power converter in the configuration of FIG. 5B;

DETAILED DESCRIPTION

Figure 1:
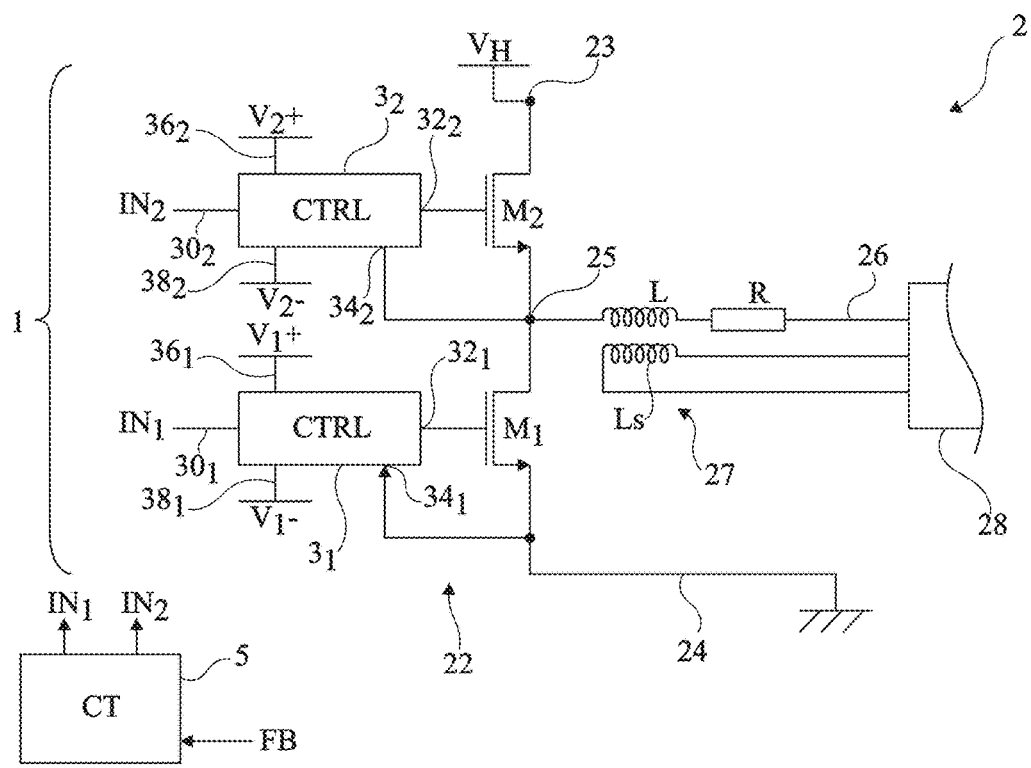
FIG. 1 is a simplified representation, in the form of blocks, of an example of a power converter equipped with an embodiment of a circuit for controlling the switches of its input stage.

The same elements have been designated with the same reference numerals in the different drawings. For clarity, only those elements which are useful to the understanding of the embodiments which will be described have been shown and will be detailed. In particular, the power converter has only been illustrated by its input stage, the described embodiments being compatible with usual power converters of switched-mode power supply type or of any circuit using at least two switches between two terminals of application of a voltage. Further, the generation of the AC power supply voltage of the converter has not been detailed either, the described embodiments being here again compatible with usual applications.

FIG. 1 schematically shows in the form of blocks an embodiment of a circuit 1 for controlling an input stage 22 of a power converter 2 of switched-mode power supply type. Input stage 22 comprises at least two field-effect transistors M2 and M1, series-connected between two terminals 23 and 24 of application of a power supply voltage (power input voltage), in this example, of a voltage VH positive with respect to ground. The power input voltage may be approximately constant at the scale of the switching frequency of transistors M1 and M2, but be variable at lower frequency (for example, the 50-Hz frequency of the power system).

In the arbitrary example of FIG. 1, junction point 25 of transistors M2 and M1 is connected to an inductive element L having its other electrode defining a terminal 26 connected to a fixed potential depending on the application, for example, the ground. Inductive element L is symbolized with its series resistance R. This inductive element forms, for example, the primary of a transformer 27 having its secondary symbolized by an inductive element Ls, connected to a circuit 28 comprising the secondary of the switched-mode power supply. This is an example, and the embodiments which will be described apply whatever the nature of the elements connected downstream or coupled to inductive element L. In the example of FIG. 1, terminal 26 has been connected to block 28 to show that it is connected to the rest of the application. The structure illustrated in FIG. 1 is commonly called half-bridge converter.

In such a converter, transistors M1 and M2 are alternately controlled to supply inductive element L with energy. Each transistor M1, M2 is controlled by a circuit 31, respectively 32, formed of field-effect transistors supplying, on a terminal 321, respectively 322, a control signal to its gate.

A specific case where circuits 31 and 32 have similar structures is considered. To simplify the following description and unless otherwise mentioned, the elements of the control circuit assigned to transistor M1 of the low half-stage will be identified with an index "1", and the elements of the control circuit assigned to transistor M2 of the high half-stage will be identified with an index "2", and these elements will be mentioned with not index when reference is indistinctively made to the two circuits.

Each circuit 3 (CTRL) comprises a terminal 34 intended to be connected to the source of the transistor M that it controls, and thus to node 25 for circuit 32 and to terminal 24 for circuit 31. Each circuit 3 is supplied with a voltage applied between two terminals 36 and 38. The potential of terminal 34 forms an intermediate potential. In other words, each circuit 3 receives a voltage V+ which is positive or zero with respect to its terminal 34 and a voltage V− which is negative or zero with respect to its terminal 34. These voltages, referenced with respect to terminal 34 which corresponds to the source of the concerned transistor M, are on the one hand linked to the need to block transistors M1 and M2 with voltages lower than their threshold voltages Vth to avoid the risk of parasitic conduction which might otherwise occur due to variations of the power supply potentials, and on the other hand linked to the need to turn on transistors M1 and M2 with voltages greater than their threshold voltages.

Usually, circuits 3 control transistors M1 and M2 so that they have alternated conduction phases. For this purpose, each circuit receives, on a terminal 30, a control signal IN originating from a circuit symbolized by a block 5 in FIG. 1, typically controlling the switching periods of power input voltage $V_H$ according to the needs of the load. Block 5 receives information representative of the needs of the load on one or a plurality of inputs FB. The generation of signals IN takes into account a need to avoid a simultaneous conduction of transistors M1 and M2 which would short-circuit power supply terminals 23 and 24.

However, when one of transistors M (M1 or M2) made non-conductive, before the other one (M2, respectively M1) is made conductive, the dead time necessary to avoid a simultaneous conduction generates losses due to the conduction of a reverse current in a transistor, due to a gate-source voltage lower than its threshold voltage. The amplitude of this phenomenon may be decreased by rapidly making the other transistor (M2, respectively M1) conductive to decrease the reverse conduction time. This amounts to decreasing the dead time. However, this requires a self-adaptation of the dead time between conduction periods of the two transistors M1 and M2 since their switching speeds (turn-on time and turn-off time) depend, among others, on the switched operating point and on temperature.

It is provided to detect, at the level of the gate of each transistor M, and thus of terminal 32 of the corresponding circuit 3, the turning-off of the other transistor M and to use this detection at the level of this same control circuit 3 to turn back on the considered transistor M. Thus, as soon as control circuit 3 of transistor M1, respectively M2, detects the turning-off of the other transistor M2, respectively M1, it causes the turning-on of transistor M1, respectively M2. This automatically decreases the dead time, and thus losses. The dead time is thus no longer fixedly generated by distant control block 5 but in self-adaptive fashion and locally by circuits 3 (CTRL).

According to this embodiment, circuits 31 and 32 are not interconnected to communicate to each other the state of the transistor that they respectively drive. The high-voltage information is directly recovered by each circuit 3 at the gate level, on the low-voltage side, of the transistor that it control, thus suppressing the need for high-voltage components or for an additional isolation device.

Figure 2:
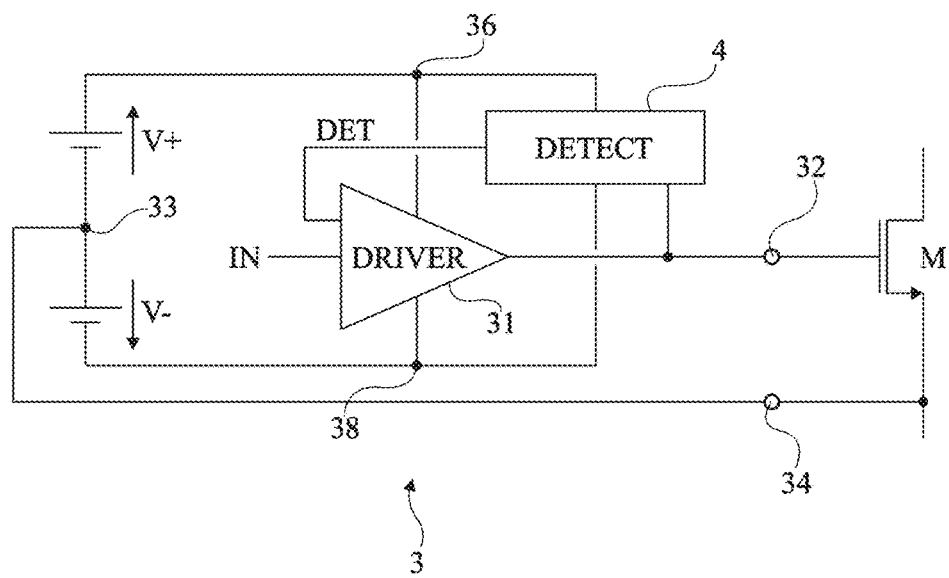
FIG. 2 is a more detailed representation of an embodiment of a portion of the control circuit of FIG. 1.

FIG. 2 schematically shows in the form of blocks an embodiment of a circuit 3. For simplification, circuits 31 and 32 of transistors M1 and M2 are structurally identical. They differ by the fact that they are connected to a different transistor and, optionally, by different supply voltages V+ and V−.

Each circuit 3 comprises an amplifier 31 (DRIVER) controlled by logic signals DET and IN. Signal IN corresponds to the turn-on control signal of the considered transistor, originating from circuit 5 which processes information relative to the needs of the load. Signal DET is a detection signal. Signals IN and DET will be detailed hereafter. Amplifier 31 is supplied with power supply voltages V+ and V− of circuit 3 (terminals 36 and 38). Terminal 34 is connected to a reference terminal 33, common to voltages V+ and V−. Circuit 3 further comprises a detection circuit 4 (DETECT), an embodiment of which will be subsequently described, and which has the function of providing information DET relative to the switching of the other transistor M2 or M1 than that associated with the considered circuit 3. Circuit 4 is supplied with voltages V+ and V−.

Figure 3:
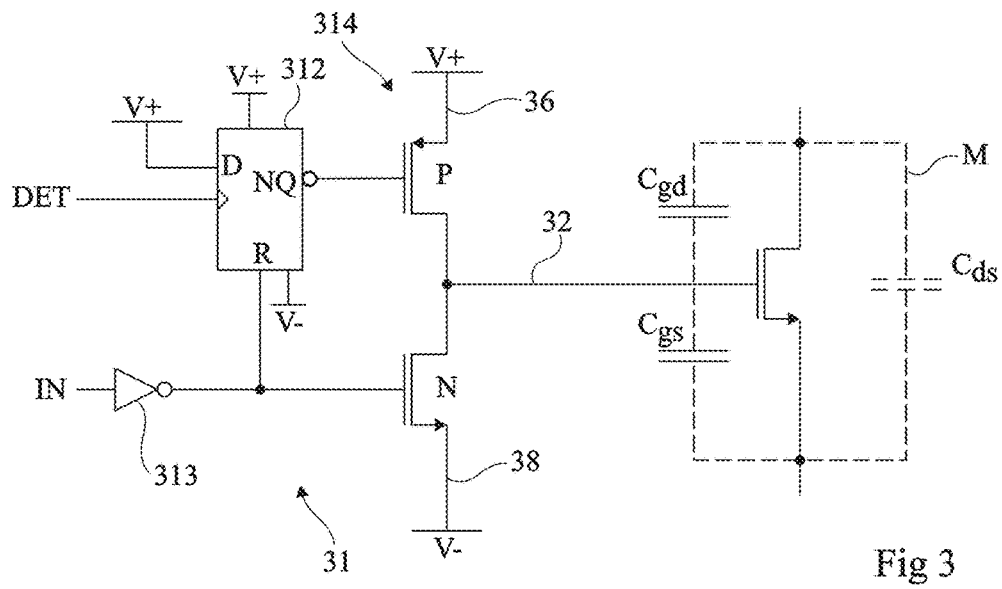
FIG. 3 schematically and partially shows a portion of the control circuit of FIG. 2.

FIG. 3 shows in more detailed fashion an embodiment of amplifier 31. The latter comprises an input stage 312 formed of a logic circuit, for example, a D flip-flop, having the function of combining the respective states of signals IN and DET to select the state of an output stage 314. Circuit 312 is supplied with voltages V+ and V− and thus provides a signal having its high state at level V+ and having its low state at level V− (neglecting voltage drops in the conductive transistors of circuit 312).

In the example of FIG. 3, the D input of flip-flop 312 receives voltage V+, its clock input receives signal DET, its R reset input receives the inverse of signal IN (inverter 313).

Circuit 312 provides the result of the combination on the gate of a first P transistor of an output stage 314 of circuit 31. Output stage 314 comprises two transistors, respectively P with a P channel, and N with an N channel, series-connected between the two terminals 36 and 38 of application of potentials V+ and V−. The gate of transistor N directly receives inverted signal IN. The midpoint of this series association defines output terminal 32 of circuit 3, intended to be connected to the gate of the concerned transistor M.

When signal IN switches to the high state, transistor P remains off until the turning-off of the other transistor M has been detected and signal DET switches to the high state, thus validating signal IN and thus the turning-on of the considered transistor M. When signal IN switches to the low state, transistors P and N simultaneously and instantaneously stop conducting.

A so-called monitoring operating phase where the two transistors P and N are non-conductive is provided. This phase is triggered by a switching of signal IN to the high state, caused by circuit 5, prior or simultaneously to the turning-off of the transistor M of the other stage by switching of its signal IN corresponding to the low state. This monitoring phase ends when the turning-off of the other transistor M is detected and signal DET switches to the high state.

On turning-off of transistor M1 or M2, if the current in inductive element L is positive, respectively negative, it forces a reverse flow in transistor M1, respectively M2. For a current in inductive element L of any sign when transistor M1, respectively M2, turns off, the potential at node 25 varies and the presence of gate-drain and gate-source capacitances Cgd and Cgs of transistors M results in that a current flows not only through drain-source capacitance Cds, but also at the level of the gate of the other transistor M2, respectively M1 via gate-drain capacitance Cgd. Circuit 32, respectively 31, then is in a monitoring phase (its signal IN is in the high state and its signal DET still is in the low state), which places output stage 314 in a high-impedance state (transistors P and N off). Circuit 42, respectively 41, can then detect this parasitic current which gives information as to the turning-off of transistor M1, respectively M2. The detection of this current by circuit 42, respectively 41, forces signal DET12, respectively DET21, to the high state.

The detection of the variation of the gate voltage or of the current flowing through the gate of transistor M1, respectively M2, corresponds to a variation of the drain-source voltage of transistor M1, respectively M2, induced by the turning-off of the other transistor.

An embodiment of detection circuit 4 will be described hereafter in relation with FIG. 10. For the time being, it should only be noted that this circuit detects the presence of a current in the gate of transistor M, while it is in an off state. One detects either a variation of the current on the gate of transistor M, or a variation of its gate-source voltage. Detecting a variation of the current on the gate or a variation of the gate-source voltage is substantially equivalent in the case where the gate is in high impedance, in monitoring mode.

The direction of the parasitic current on turning-off of transistor M1, respectively M2, in the stray capacitances of transistor M2, respectively M1, in the off state, depends on the variation direction of potential 25 which depends on the current flow direction in inductive element L (FIG. 1).

Figure 4A:
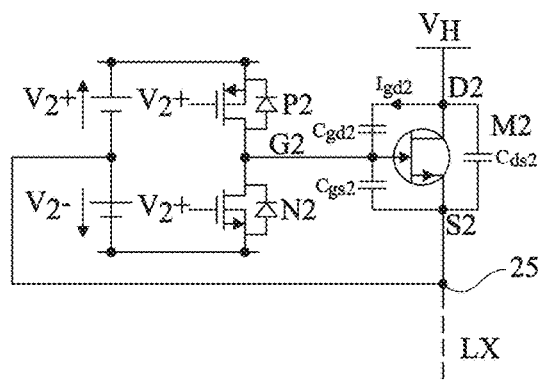
FIGS. 4A and 4B partially show elements of the circuit of FIG. 3, applied to the circuit for controlling one of the switches of the converter input stage, and illustrate two operating configurations.
Figure 4B:
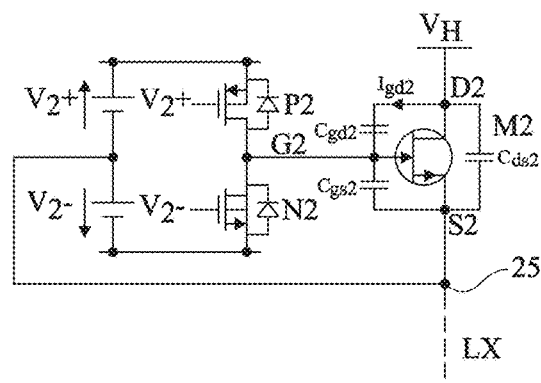

FIGS. 4A and 4B partly show the elements of FIG. 3 to illustrate the operation of circuit 32 on turning-off of transistor M1 while the current in the inductive element is positive and thus flows from node 25 to node 26. FIG. 4A illustrates the biasing of transistors P2 and N2 in normal operation. FIG. 4B illustrates the biasing of transistors P2 and N2 in monitoring mode.

For the following, on-state voltage drops in the different transistors, including those of detector 4 and of logic circuit 312, are neglected.

In normal operation, in the example of FIG. 4A where transistor M2 is assumed to be off, the respective gates of transistors P2 and N2 are taken to positive potential V2+. Transistor P2 is thus non-conductive and transistor N2 is conductive. On turning-off of transistor M1, a negative parasitic current Igd2 flows through gate-drain capacitance Cgd2 of transistor M2 (from the drain to the gate), transistor N2, voltage source V2− to reach transistor M1 (not shown in FIG. 4A) and drain off parasitic charges.

When signal IN2 switches to the high state, circuit 32 is placed in monitoring mode, shown by FIG. 4B, while signal DET provided by circuit 42 is in the low state. In this operating mode, circuit 312 directly applies the inverse of signal IN2 (and thus a low state) to transistor N2 while it holds the high level applied to the gate of transistor P2 until the switching of transistor M1 is detected, thus marking the end of this mode. Accordingly, in monitoring mode, the two transistors N2 and P2 forming output stage 3142 of circuit 32 are non-conductive, stage 3142 is in high impedance. As transistor M1 is made non-conductive, the parasitic current then flows from the drain to the source of transistor M2 through its gate-drain and gate-source capacitances Cgd2 and Cgs2.

In the case of FIG. 4A, the flowing of negative parasitic current Igd2 has almost no impact on the shape of the gate voltage of transistor M2. In the case of FIG. 4B, the negative gate-drain current can no longer flow through transistor N2 to reach potential V2− (its parasitic source-drain diode is reverse-biased). Accordingly, capacitances Cgs2 and Cgd2 form a capacitive dividing bridge and the gate-source capacitance charges and increases the value of the gate potential by a quantity depending on the amplitude of the potential variation at node 25 and on the values of capacitances Cgd2 and Cgs2. Actually, on turning-off of transistor M1, it can be considered, in the case of a field-effect transistor M1 with no diode between its drain and source, that the variation of gate voltage Vgs2 is $dVgs2=(Vth1-Vgs1)\cdot Cgd2/(Cgs2+Cgd2)$, where Vth1 is the threshold voltage of transistor M1. In the case of a transistor M1 with a diode in antiparallel (internal or not), the variation of gate voltage Vgs2 is $dVgs2=Vf1\cdot Cgd2/(Cgs2+Cgd2)$, where Vf1 is the voltage drop across the diode during a reverse current flow. It is provided to detect variation dVgs2 of the gate voltage of transistor M2 due to the specific monitoring mode to detect the turning-off of transistor M1.

The fact of placing output stage 314 in a high-impedance state in the monitoring mode, that is, where its two transistors are off, enables to avoid the use of current mirrors in this output stage. Such current mirrors should conventionally be formed with transistors of significant size to limit the series resistance that they introduce. The provided embodiment avoids this constraint. Space is thus gained and the performance of the output stage is increased.

This operation is similar, on the side of circuit $3_1$ to the turning off of transistor $M_2$ while the current in inductive element L is negative, flowing from node 26 to node 25.

Figure 5A:
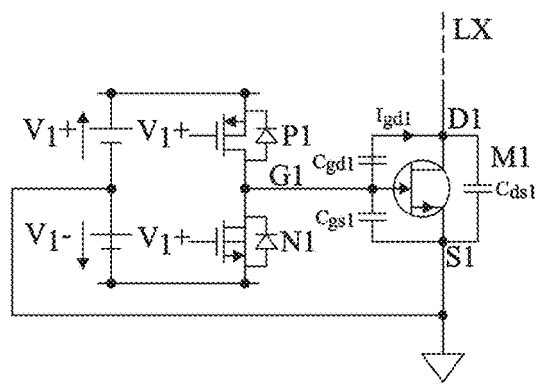
FIGS. 5A and 5B partially show elements of FIG. 3, applied to the circuit for controlling the other switch of the converter input stage, and illustrate two operating configurations.
Figure 5B:
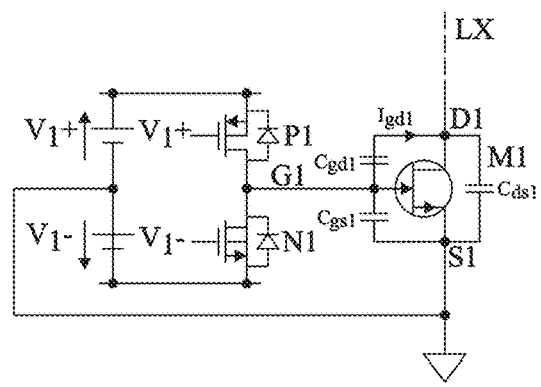

FIGS. 5A and 5B partly show the elements of FIG. 3 to illustrate the operation of circuit 31 on turning-off of transistor M2 while the current in the inductive element is positive and flows from node 25 to node 26. FIG. 5A illustrates the biasing of transistors P1 and N1 in normal operation. FIG. 5B illustrates the biasing of transistors P1 and N1 in monitoring mode.

In normal operation, in the example of FIG. 5A where transistor M1 is assumed to be off, the respective gates of transistors P1 and N1 are taken to positive potential V1+. Transistor P1 is thus non-conductive and transistor N1 is conductive. On turning-off of transistor M2, a positive parasitic current Igd1 flows through gate-drain capacitance Cgd1 of transistor M1 (from the gate to the drain), transistor N1, voltage source V1−, to reach transistor M2 and drain off parasitic charges.

When signal IN1 switches to the high state, circuit 31 is placed in monitoring mode, shown by FIG. 5B, while signal DET provided by circuit 41 is in the low state. In this operating mode, circuit 312 directly applies the inverse of signal IN1 (and thus a low state) to transistor N1 while it holds the high level applied to the gate of transistor P1 until the switching of transistor M2 is detected, thus marking the end of this mode. Accordingly, in monitoring mode, the two transistors N1 and P1 forming output stage 3141 of circuit 31 are off, stage 3141 is in high impedance. On turning-off of transistor M2, the induced positive parasitic current Igd1 then flows through transistor N1 in reverse conduction from the gate to the drain of transistor M1 through its gate-drain capacitance Cgd1.

In the case of FIG. 5A, the flowing of positive parasitic current Igd1 has almost no impact on the shape of the gate voltage of transistor M1. FIG. 5B, the positive gate-drain current no longer flows through a properly turned-on transistor N1 to reach node 25. This current still flows in reverse through transistor N1 having a gate-source voltage this time lower than its threshold voltage Vth2. The flowing of this current thus induces a negative variation dVgs1 of the gate voltage of transistor M1 equal to voltage drop VfN1 across component N1 reversely conducting parasitic current Igd1 under the threshold. Variation dVgs1 is provided to be detected due to the specific monitoring mode to detect the turning-off of transistor M2.

This operation is similar, on the side of circuit 32 to the turning-off of transistor M₁ while the current in inductive element L is negative, flowing from node 26 to node 25.

FIGS. 6A, 6B, 6C, 6D, 6E, 6F, 6G, and 6H illustrate, in the form of timing diagrams, an example of operation of the circuit in the configuration of FIG. 4B, that is, of detection of the turning-off of transistor M1 due to the monitoring mode. FIGS. 6A to 6H respectively show examples of shapes of current IL in inductance L, assuming a flowing of the current from node 25 to node 26, of drain current Id2 in transistor M2, of drain current Id1 in transistor M₁, of potential LX of node 25, of the state of signals IN2 and DET12, where DET12 designates the detection signal supplied by circuit 42 of circuit 32, of gate-source voltage Vgs2 of transistor M2, of the states of signals IN1 and DET21, where DET21 designates the detection signal supplied by circuit 41 of circuit 31, and of gate-source voltage Vgs1 of transistor M1.

Hereafter, the arbitrary case where transistors M1 and M2 are field-effect transistors of same technology and with no internal parasitic diode in antiparallel is considered. Voltages V1+ and V1−, respectively V2+ and V2−, are sufficiently distant from threshold voltage Vth1, respectively Vth2, so that transistor M1, respectively M2, has both a good conductive state and a good non-conductive state.

An initial state (time t60) where transistor M1 is conductive and transistor M2 is non-conductive is assumed. A (positive) current flows through inductance L (FIG. 6A). Transistor M2 being non-conductive, its drain current Id2 is zero (FIG. 6B) or at a negligible level (low as compared with the current flowing through the transistor in the conductive state). A (negative) current flows through the drain of transistor M1 in the conductive state (FIG. 6C). Voltage LX at node 25 is approximately zero (FIG. 6D). Signal DET12 (FIG. 6E), supplied by circuit 32 and indicating the state of transistor M1 is in the low state (V2−). The monitoring mode is deactivated (signal IN2 in the low state (V2−)). Gate-source voltage Vgs2 (FIG. 6F) of transistor M2 is in low state V2−, lower than its threshold voltage (Vth2) while that, Vgs1 (FIG. 6H), of transistor M1 is in the high state V1+. Signal IN1 is in the high state (FIG. 6H) and signal DET21 is in the low state.

At a time t61, circuit 5 causes a switching of circuit 32 to the monitoring mode by switching signal IN2 to the high state while signal DET12 is in the low state. This switching at time t61 is caused by circuit 5, typically before the turning-off of transistor M1, but it may also occur at the same time or afterwards.

At a time t62, transistor M1 is controlled to the off state by the switching of signal IN1 to the low state (FIG. 6G), causing a drop in its gate-source voltage (FIG. 6H) until it reaches level V1−. When this voltage becomes lower than its threshold voltage Vth1 (time t63), transistor M1 stops conducting. This causes a drop in voltage LX to a negative value Vgs1−Vth1 (reverse conduction of the current below the threshold of transistor M1 with no free wheel diode) reached at a time t64. Between times t63 and t64, the variation of the potential of node 25 increases gate-source voltage Vgs2 of transistor M2 by the parasitic current flowing through its gate-source capacitance Cgs2 (see FIG. 4B). This variation is assumed to be detected by circuit 42 at a time t65, subsequent to time t64. Signal DET12 then switches to the high state. This information is received by logic circuit 3122 of control circuit 3 of transistor M2, which causes the stopping of the monitoring mode.

From this time on, one can be sure that transistor M1 is off and that transistor M2 can thus be turned on. Logic circuit 3122 then turns on transistor P2 which increases the gate-source voltage of transistor M2 and causes its turning-on at a time t66 (FIG. 6F), where a drain current Id2 appears while that of transistor M1 disappears and voltage LX starts increasing until it approximately reaches potential VH.

At a time t65', depending on the structure of circuit 42, which may be any time provided that it comes after time t65 and before the switching of signal IN2 to the low state (not shown in the drawings), signal DET12 switches back to the low state.

FIGS. 7A, 7B, 7C, 7D, 7E, 7F, 7G, and 7H show the signals of FIGS. 6A to 6H and illustrate an example of operation of the circuit in the configuration of FIG. 5B. In the same way as for FIGS. 6A to 6H, current IL in inductance L is assumed to be positive and to flow from node 25 to node 26.

An initial state (time t70) corresponding to the final state of FIGS. 6A to 6H is assumed.

At a time t71, circuit 5 causes a switching of circuit 31 to the monitoring mode by switching signal IN1 to the high state while signal DET21 is in the low state. This switching at time t71 is caused by circuit 5, typically before transistor M2 stops conducting, but it may also occur at the same time or afterwards.

The turn-off control of transistor M2 at time t72 (switching to the low state of signal IN2) causes a drop in its gate-source voltage (FIG. 7F) to level V2−. When gate-source voltage Vgs2 becomes lower than its threshold voltage Vth2 (time t73), transistor M2 stops conducting. This causes the falling to zero of current Id2 in the drain of transistor M2, the reverse conduction of the current by transistor M1, and a drop of voltage LX to negative value Vgs1−Vth1 that it reaches at a time t74. Between times t73 and t74, the potential variation at node 25 decreases the gate-source voltage Vgs1 of transistor M1 by the parasitic current flowing through its gate-source capacitance Cgs1 (see FIG. 5B) and in output stage 3141 of circuit 31. This variation is assumed to be detected by circuit 41, at a time t75, thus switching signal DET21 to the high state. This information is received by logic circuit 3121 of control circuit 31 of transistor M1, which immediately causes the stopping of the monitoring mode.

From this time on, one can be sure that transistor M2 is off and that transistor M1 can thus be turned on. Logic circuit 3121 then turns on transistor P1, which increases the gate-source voltage of transistor M1 and causes its turning-on at a time t76 (FIG. 7H), when voltage LX starts increasing to tend to a low value, corresponding to the product of the on-state drain-source resistance of the transistor by the current that it conducts. For simplification, this value is neglected and FIG. 7H shows a canceling of voltage LX.

At a time t75', subsequent to time t75, signal DET21 switches back to the low state.

FIGS. 8A, 8B, 8C, 8D, 8E, 8F, 8G, and 8H are timing diagrams to be compared with FIGS. 7A to 7H and illustrate the detection, by circuit 31, of the turning-off of transistor M2 while the current in inductance L is negative, flowing from node 26 to node 25. The operation can be deduced from that illustrated in FIGS. 7A to 7H, considering a negative current IL. The times bear references t80, t81, t82, t83, t84, t85, t85', and t86.

FIGS. 9A, 9B, 9C, 9D, 9E, 9F, 9G, and 9H are timing diagrams to be compared with FIGS. 6A to 6H and illustrate the detection, by circuit 32, of the turning-off of transistor M1 while the current in inductance L is negative, flowing from node 26 to node 25. The operation can be deduced from that illustrated in FIGS. 6A to 6G, considering a negative current IL. The times bear references t90, t91, t92, t93, t94, t95, t95', and t96.

Figure 10:
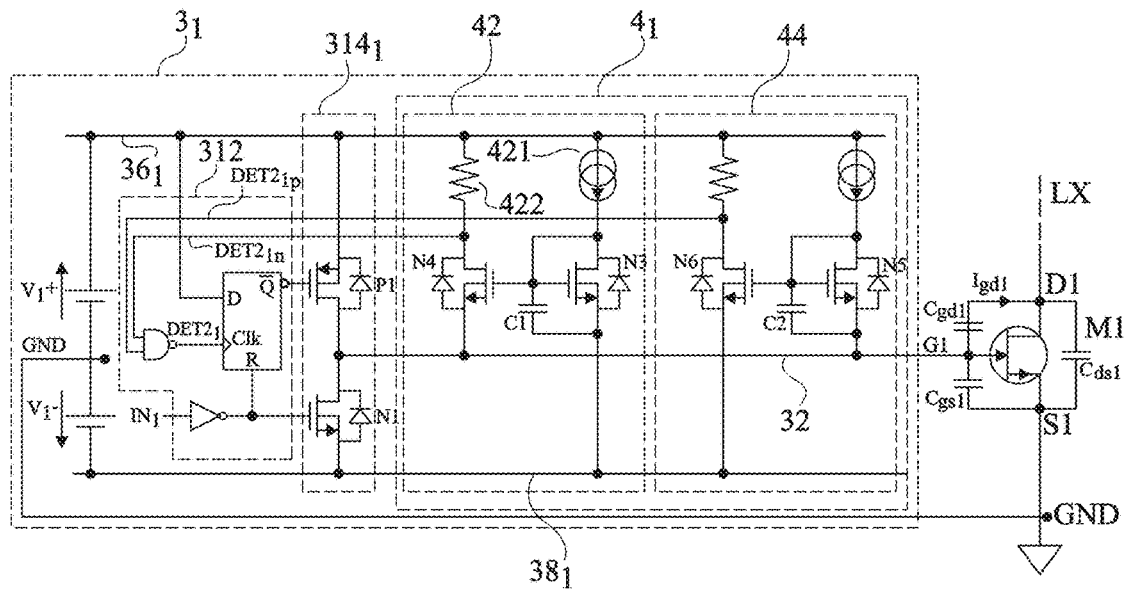
FIG. 10 schematically shows a detailed embodiment of a variation of a detection circuit of the circuit of FIG. 2.

FIG. 10 shows an embodiment of a circuit 41 for detecting the gate-drain current in transistor M1. FIG. 10 takes the example of circuit 41 assigned to transistor M1 but the assembly for transistor M2 is similar, only the connections of the inputs/outputs change.

Circuit 4 is formed of a detector 42 of positive current Igd, of a detector 44 of negative current Igd.

Circuit 42 comprises two N-channel MOS transistors, N3 and N4, having interconnected gates. Transistor N3 is connected, by its drain, to terminal 361 of application of potential V1+ by a current source 421 and, by its source, directly to terminal 381. Transistor N4 is connected, on its drain side, to terminal 361 by a resistor 422 and, on the source side, directly to terminal 32. A capacitive C1 connects the gate and the source of transistor N3 having its gate and its drain interconnected. The junction point of transistor N4 and resistor 422 provides a signal DET21n indicative of the switching of transistor M2 for a negative current IL.

When transistor M2 turns off, current Igd1 flows through the parasitic diode of transistor N1 (see FIG. 5B). The potential of terminal 32, and thus of the source of transistor N4 decreases while its gate remains at a same potential under the effect of capacitance C1. The gate-source voltage of transistor N4 thus starts increasing at the same time as the gate-source voltage of transistor M1 decreases. The imbalance generated at the level of the current mirror increases the current in the branch of transistor N4 which is no longer limited by the value set by current source 421. This then causes a switching of the drain of transistor N4 which switches from a level approximately equal to V1+ to a level approximately equal to V1− (equivalent of the switching of time t75 in FIG. 7G).

Circuit 44 of detection of a negative current Igd then operates according to the same principle and comprises two transistors N5 and N6 assembled as a current mirror, the drain of transistor N5 being connected by a current source to terminal 361. Its source is connected to terminal 32. Transistor N6 has its drain connected by a resistor 422 to terminal 361 and its source directly connected to terminal 38. The gates of transistors N5 and N6 are interconnected to the drain of transistor N5 and connected, by a capacitive element C2 to terminal 32. The junction point of resistor 422 and of transistor N6 supplies a signal DET21p indicative of the switching of transistor M2 when current IL is positive (time t85, FIG. 8G).

In an assembly of the type in FIG. 1, a detector 42 on the side of transistor M2 and a detector 44 on the side of transistor M1 are sufficient since the current flow direction is known.

Figure 11:
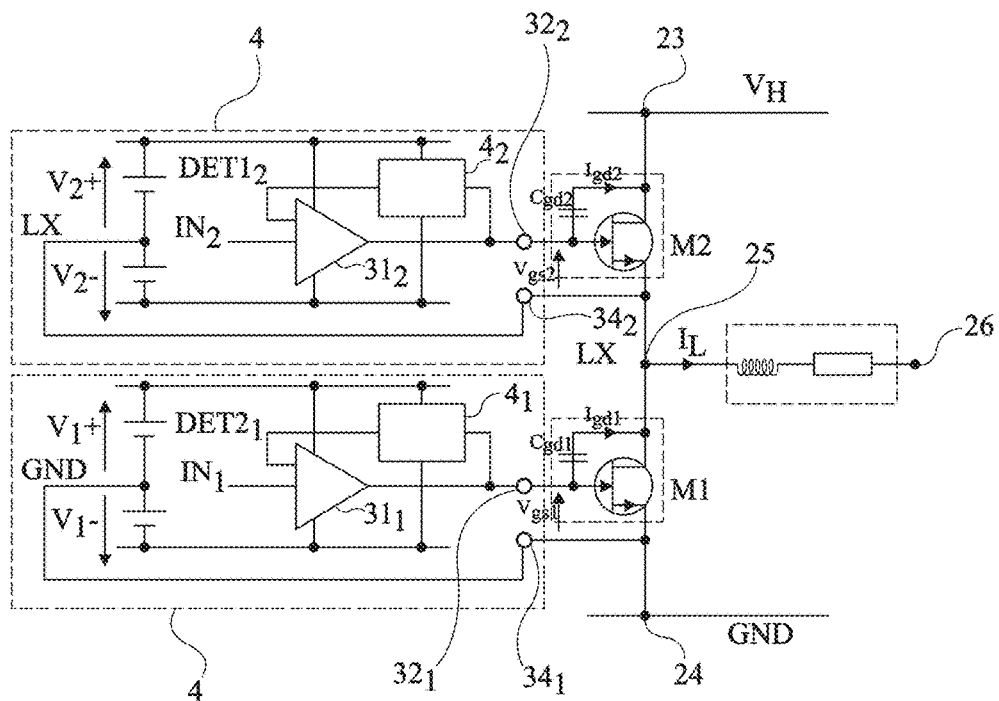
FIG. 11 is a block diagram illustrating an example of architecture applied to FIG. 1.

FIG. 11 shows an example of a general architecture detailing FIG. 1. A circuit 4 is assigned to each transistor M1 and M2. The two circuits 4 of FIG. 11 may be different from each other and provide signals DET12 and DET21 based either on a negative parasitic current detector 44 (FIG. 10), or on a positive current detector 42 (FIG. 10). However, the two circuits 4 of FIG. 11 may also be similar and be based on a positive and negative parasitic current detector 42 and 44 (FIG. 10) operating in parallel.

In the previous drawings, voltages V1+ and V1− have been referenced differently from voltages V2+ and V2−. The voltages V+ and V− of each circuit may however be identical.

An advantage of the described embodiments is that it is now possible to shorten the dead time between switchings of the switching transistors of a power converter. Another advantage is that the circuit is autonomous and requires no external control signal. Further, it requires no high-voltage component and no additional isolation device. This embodiment is easy to use with conventional architectures of control circuits using a technology based on field-effect transistors and is compatible with any field-effect switching transistor.

An advantage of the described embodiments is that each control circuit is autonomous in that the two control signals respectively associated with each transistor M1, M2 do not need to communicate together.

Various embodiments have been described. Various alterations, modifications, and improvements will readily occur to those skilled in the art. In particular, the practical implementation of the above-described converter control circuit is within the abilities of those skilled in the art based on the functional indications which have been given. In particular, any practical forming of a switch associated with the provided control circuit to detect a voltage variation between the high-voltage terminals (drain and source) of transistor M at the level of its gate in a low-voltage range due to the specific monitoring mode and to the parasitic current detectors can be deduced from the functional description of circuit 3 coupled with transistor M. Further, although the forming of an output stage 314 of the control circuit combining P-channel and N-channel transistors has been described, this output stage may be formed with two P-channel transistors or two N-channel transistors. Further, the forming of the logic combination of signals IN and DET with usual logic gates can be deduced from the functional description of the states desired at the output of circuits 312 and may thus vary with respect to the example of FIG. 3. Moreover, the selection of the voltage and of the values to be given to the components depends on the application. Similarly, the selection of the technologies of the switching transistors and of the transistors of the control circuit depends on the application.

What is claimed is:

1. A circuit for controlling a first field effect transistor of a power converter, intended for a converter comprising at least a first and a second field effect transistor series-connected between two terminals of application of a first voltage, the circuit comprising:
   an output terminal intended to be connected to the gate of the first field effect transistor;
   an input terminal intended to be connected to the source of the first field effect transistor;
   two control transistors series-connected between two terminals of application, respectively, of a first power supply voltage which is positive or zero with respect to the potential present on the input terminal and of a second power supply voltage which is negative or zero with respect to the potential of the input terminal, wherein the junction point of the two series-connected control transistors is connected to the gate of the first field effect transistor;
   a control terminal intended to receive a control signal for controlling the turning on or off of the first field effect transistor;
   a detection circuit for detecting a variation of the drain-source voltage due to the turning-off of the second field effect transistor, wherein the detection circuit is connected to the gate of the first field effect transistor and detects a variation of the gate current or of the gate-source voltage of the first field effect transistor when the control circuit is in a first operating mode, called monitoring mode, in which the two control transistors are off, placing the gate of the first field effect transistor in a high-impedance state; and a logic block for combining the control signal and at least one signal supplied by the detection circuit to control the turning on or off of each of the control transistors.

2. The circuit of claim 1, wherein the detection circuit is powered between the two terminals of application of the first and second power supply voltages.

3. The circuit of claim 1, wherein the detection circuit comprises at least one stage comprising a current mirror formed of two MOS having a transistor having its source connected to a terminal of application of the second power supply voltage, the other transistor having its source connected to the output terminal of the control circuit.

4. A power converter, comprising:

at least a first and a second field effect transistor series-connected between two terminals of application of a first voltage; and a circuit configured to control the first field effect transistor, comprising:

an output terminal intended to be connected to the gate of the first field effect transistor;

an input terminal intended to be connected to the source of the first field effect transistor;

two control transistors series-connected between two terminals of application, respectively, of a first power supply voltage which is positive or zero with respect to the potential present on the input terminal and of a second power supply voltage which is negative or zero with respect to the potential of the input terminal, wherein the junction point of the two series-connected control transistors is connected to the gate of the first field effect transistor;

a control terminal intended to receive a control signal for controlling the turning on or off of the first field effect transistor;

a detection circuit for detecting a variation of the drain-source voltage due to the turning-off of the second field effect transistor, wherein the detection circuit is connected to the gate of the first field effect transistor and detects a variation of the gate current or of the gate-source voltage of the first field effect transistor when the control circuit is in a first operating mode, called monitoring mode, in which the two control transistors are off, placing the gate of the first field effect transistor in a high-impedance state; and a logic block for combining the control signal and at least one signal supplied by the detection circuit to control the turning on or off of each of the control transistors.

5. The power converter of claim 4, wherein the input terminal of the circuit is connected to one of the terminals of application of the first voltage.

6. The power converter of claim 5, further comprising a second circuit configured to control the second field effect transistor, wherein an input terminal of the second circuit is connected to a junction point between the first and second field effect transistors.

7. The power converter of claim 4, wherein the detection circuit is powered between the two terminals of application of the first and second power supply voltages.

8. The power converter of claim 4, wherein the detection circuit comprises at least one stage comprising a current mirror formed of two MOS having a transistor having its source connected to a terminal of application of the second power supply voltage, the other transistor having its source connected to the output terminal of the control circuit.

* * * * *